United States Patent
Wu et al.

(10) Patent No.: US 11,123,894 B2
(45) Date of Patent: Sep. 21, 2021

(54) METHOD FOR QUICK HOT-PRESS FORMING OF LAMINATED WOOD

(71) Applicant: Central South University of Forestry and Technology, Changsha (CN)

(72) Inventors: Yiqiang Wu, Changsha (CN); Xia Zheng, Changsha (CN); Xingong Li, Changsha (CN); Xianjun Li, Changsha (CN); Yan Qing, Changsha (CN); Yingfeng Zuo, Changsha (CN); Ming Liu, Changsha (CN)

(73) Assignee: Central South University of Forestry and Technology, Changsha (CN)

( * ) Notice: Subject to any disclaimer, the term of this patent is extended or adjusted under 35 U.S.C. 154(b) by 161 days.

(21) Appl. No.: 16/570,192

(22) Filed: Sep. 13, 2019

(65) Prior Publication Data

US 2020/0406494 A1    Dec. 31, 2020

(30) Foreign Application Priority Data

Jun. 28, 2019    (CN) .......................... 201910573444.7

(51) Int. Cl.
| | | |
|---|---|---|
| *B27N 3/18* | (2006.01) | |
| *B27N 3/00* | (2006.01) | |
| *B27N 3/02* | (2006.01) | |
| *C08L 61/24* | (2006.01) | |

(52) U.S. Cl.
CPC .............. *B27N 3/18* (2013.01); *B27N 3/002* (2013.01); *B27N 3/02* (2013.01); *C08L 61/24* (2013.01)

(58) Field of Classification Search
CPC ........ B27D 1/08; B27D 5/00; B27N 3/00–28; B27N 5/00
See application file for complete search history.

(56) References Cited

U.S. PATENT DOCUMENTS

| 4,018,642 | A | * | 4/1977 | Pike | ...................... | B27D 1/025 |
|---|---|---|---|---|---|---|
| | | | | | | 156/272.2 |
| 5,133,822 | A | * | 7/1992 | Fujii | ....................... | B27M 1/08 |
| | | | | | | 156/274.8 |
| 2008/0110565 | A1 | * | 5/2008 | Parker | ..................... | B27N 3/18 |
| | | | | | | 156/296 |
| 2010/0075095 | A1 | * | 3/2010 | Johnson | ................... | B27N 3/04 |
| | | | | | | 428/53 |
| 2011/0089611 | A1 | * | 4/2011 | Hoffman | ................... | F26B 3/20 |
| | | | | | | 264/489 |
| 2016/0361833 | A1 | * | 12/2016 | Wang | ..................... | B27N 3/203 |
| 2018/0215069 | A1 | * | 8/2018 | Lewis | ...................... | B27N 3/18 |
| 2019/0233214 | A1 | * | 8/2019 | Levine | ................... | B27N 3/002 |

* cited by examiner

*Primary Examiner* — Mary Lynn F Theisen
(74) *Attorney, Agent, or Firm* — Troutman Pepper Hamilton Sanders LLP; Christopher C. Close, Jr.

(57) ABSTRACT

The present invention discloses a method for quick hot-press forming of laminated wood. The method includes: drying a machined small wood material to a moisture content of 5-8 wt %; gluing the dried small wood material, and assembling and laying the dried small wood material to be a square material or a sheet material, where an adhesive for the gluing is a water-soluble adhesive having a solid content of 45-60 wt %; clamping the square material or the sheet material through a three-dimensional metal clamp; sending the clamped square material or sheet material together with the clamp into a microwave heating machine for microwave heating to obtain a formed laminated wood, where the time from the gluing to the entry into the microwave heating machine is controlled to not exceed 15 min. According to the present invention, a glued part that needs to be heated can be heated quickly, precisely and effectively, the gluing strength and production efficiency of the laminated wood can be significantly improved, and the cost of production energy consumption is reduced.

2 Claims, No Drawings

METHOD FOR QUICK HOT-PRESS FORMING OF LAMINATED WOOD

This application claims priority to Chinese application number 201910573444.7, filed Jun. 28, 2019, with a title of METHOD FOR QUICK HOT-PRESS FORMING OF LAMINATED WOOD. The above-mentioned patent application is incorporated herein by reference in its entirety.

TECHNICAL FIELD

The present invention belongs to the field of material manufacturing for the construction industry, furniture and decoration industry, and in particular relates to a method for quick hot-press forming of laminated wood.

BACKGROUND

Laminated wood is made of small-diameter wood as a raw material, is machined into a plate and is then subjected to a series of processes such as drying, subdivision, cutting, material selection, slicing, finger joint, splicing and subsequent processing to be made into a small wood material with a certain width, thickness and length. The small wood material is characterized by having great use and high strength and the like, and can be applied to the fields such as the construction industry, furniture and the decoration industry.

In the laminated wood production process, after being lengthened, widened and thickened, the small material needs to be sent to a hot press for hot pressing to be formed after the adhesive is cured. In ordinary hot press forming, heating is mainly performed by heat conduction, that is, heat is conducted from a surface layer to the inside. Due to the slow heat conduction rate, long heating time and low heat transfer and forming efficiency of wood, the production efficiency of the laminated wood is reduced, and the production energy consumption and cost thereof are increased. Moreover, the long heating time has an effect on the strength of the surface layer wood.

SUMMARY

The technical problem to be solved by the present invention is how to overcome the shortcomings mentioned in the above background art, and to provide a method for quick hot-press forming of laminated wood to improve forming efficiency and wood strength.

In order to solve the above technical problem, the technical solution proposed by the present invention is:

a method for quick hot-press forming of laminated wood, including the following steps:

step S1: drying a machined small wood material to a moisture content of 5-8 wt %;

step S2: gluing the dried small wood material, and assembling and laying the dried small wood material to be a square material or a sheet material, where an adhesive for the gluing is a water-soluble adhesive having a solid content of 45-60 wt %;

step S3: clamping the square material or the sheet material through a three-dimensional metal clamp;

step S4: sending the clamped square material or sheet material together with the clamp into a microwave heating machine for microwave heating to obtain a formed laminated wood, where the time from the gluing to the entry into the microwave heating machine is controlled to not exceed 15 min.

Further, the gluing in step S2 uses a urea-formaldehyde resin adhesive.

Further, the amount of the adhesive applied in step S2 is 150-360 g/m$^2$.

Further, a clamping force of the clamp in step S3 is 1.0-2.5 MPa.

Further, the microwave heating operating temperature in step S4 is 100-200° C.

Further, the microwave heating microwave frequency in step S4 is 1.5-2.5 GHz.

Further, the time from the square material or sheet material entry into the microwave heating machine to the leaving from the microwave heating machine in step S4 is 5-10 min.

Microwaves have obvious features such as short wavelength, high frequency, and fast heating. Moreover, microwave heating is selective. Microwaves have different effects on materials of different properties. Since water molecules absorb the microwaves best, a wet part of the material has stronger capability of absorbing the microwaves than a dry part, so the part with a high water content absorbs more microwave power than the part with a lower water content. Therefore, the wet part of the material receives more heat than the dry part, and the temperature of the wet part is also higher that of the dry part.

The hot press forming of the laminated wood only requires the heating of a glued part, and the adhesive is cured by heating, thereby forming the laminated wood. The present invention can make full use of the selectivity of microwave heating. The wood is dried to a moisture content of 5-8 wt %. The dry wood has less absorption of microwaves, and less heat is generated during heating. In the production process of the laminated wood, since the adhesive is just applied to the glued part, the moisture content is relatively high, absorbed microwaves are more, and heat generated during heating is more, so that the glued part can quickly reach a curing temperature of the adhesive, thereby achieving rapid forming of the laminated wood.

Compared with the prior art, the present invention has the following beneficial effects:

1. According to the present invention, a glued part that needs to be heated can be heated quickly, precisely and effectively, the gluing strength and production efficiency of the laminated wood can be significantly improved, and the cost of production energy consumption is reduced.

2. Since the present invention can achieve quick hot-press forming, the heating time is short, the pre-curing of the adhesive is avoided, and the strength of the wood can be improved.

3. In a conventional process, the hot pressing time of the hot-press forming of the laminated wood is related to a thickness of the product, and the larger the thickness, the longer the hot pressing time. The present invention uses microwave heating, the heating starts from the inside, and the heating time is independent of the thickness of the product.

4. There is no need for cooling at the end of hot pressing, which improves production efficiency.

DETAILED DESCRIPTION OF EMBODIMENTS

In order to facilitate the understanding of the present invention, the present invention will be described more fully and in detail below with reference to the preferred embodiments, but the protection scope of the present invention is not limited to the following specific embodiments.

Unless otherwise defined, all technical terms used hereinafter have the same meaning as commonly understood by those skilled in the art. The technical terms used herein are for the purpose of describing specific embodiments, and are not intended to limit the protection scope of the present invention.

Unless otherwise specified, the reagents, equipment, and the like used in the present invention are commercially available or can be prepared by an existing method.

A method for quick hot-press forming of laminated wood according to an embodiment of the present invention includes the following steps:

Step 1: send a machined small wood material into an ordinary wood drying kiln for drying to a moisture content of 5-8 wt %.

Step 2: prepare an adhesive, adopt a water-soluble adhesive, and the solid content of the adhesive is required to be 45-60 wt %. In a specific embodiment, a urea-formaldehyde resin adhesive is used.

Step 3: lay the dried small wood material into a square material or a sheet material with a certain specification according to a gluing and assembly process in the process of production of ordinary laminated wood, where the amount of glue applied is 150-360 g/m².

Step 4: clamp the laid square material or sheet material with a certain specification through a three-dimensional metal clamp, where a clamping force is 1.0-2.5 MPa.

Step 5: send the clamped square material or sheet material together with the clamp into a microwave heating machine.

A main body of the microwave heating machine has a box type structure, and a lower portion of the box type structure is provided with a roller conveyor. The roller conveyor in the heating machine is responsible for transporting the clamped square material or sheet material together with the clamp into the microwave heating machine from one end of the wood microwave heating machine, and transporting the clamped square material or sheet material together with the clamp out from the other end. An operating temperature is 100-200° C., and a microwave frequency is 1.5-2.5 GHz.

In order to prevent moisture in the adhesive from massively permeating into the interior of the wood and affecting the heating and temperature of a glued part during microwave heating, it is required that the time from the gluing to the entry into the microwave heating machine does not exceed 15 min. If the time exceeds 15 min, the moisture in the adhesive will permeate into the wood too much, resulting in a decrease in the moisture content of the glued part and a decrease in the hot pressing effect.

The time from the entry into the microwave heating machine to the leaving from the microwave heating machine is generally 5-10 min. If the heating time is too long, the glued part is carbonized; if the heating time is too short, the temperature is too low, the curing rate of the adhesive is lowered, and the gluing strength is affected.

Step 6: take out the hot-pressed square material or sheet material to obtain a formed laminated wood with a certain specification and stack the laminated wood for storage.

Details will be described below by way of embodiments and reference examples.

Embodiment 1

Step 1: send a machined small wood material (poplar) into an ordinary wood drying kiln for drying to a moisture content of 5%.

Step 2: prepare a urea-formaldehyde resin adhesive having a solid content of 50%.

Step 3: lay the dried small wood material into a square material or a sheet material with a certain specification according to a gluing and assembly process in the process of production of ordinary laminated wood, where the amount of glue applied is 220 g/m².

Step 4: clamp the laid square material or sheet material with a certain specification through a three-dimensional metal clamp, where a clamping force is 2.5 MPa.

Step 5: send the clamped square material or sheet material together with the clamp into a wood microwave heating machine, where the heating time is 8 min, a heating temperature is 130° C., and a microwave frequency is 1.8 GHz.

Step 6: take out the hot-pressed square material or sheet material to obtain a formed laminated wood with a certain specification and stack the laminated wood for storage.

Compared with an ordinary hot-press forming technology, the method improves the forming efficiency by 190%. The strength comparison is shown in the following table.

|  | Static bending intensity (MPa) | Elasticity modulus (MPa) | Shear strength (MPa) |
| --- | --- | --- | --- |
| Common laminated wood of poplar | 62.4 | 8100 | 3.1 |
| Laminated wood of poplar in this embodiment | 85.7 | 10400 | 4.3 |

Embodiment 2

Step 1: send a machined small wood material (eucalyptus) into an ordinary wood drying kiln for drying to a moisture content of 6%.

Step 2: prepare a urea-formaldehyde resin adhesive having a solid content of 45%.

Step 3: lay the dried small wood material into a square material or a sheet material with a certain specification according to a gluing and assembly process in the process of production of ordinary laminated wood, where the amount of glue applied is 190 g/m².

Step 4: clamp the laid square material or sheet material with a certain specification through a three-dimensional metal clamp, where a clamping force is 2.0 MPa.

Step 5: send the clamped square material or sheet material together with the clamp into a wood microwave heating machine, where the heating time is 6 min, a hot-pressing temperature is 150 □, and a microwave frequency is 2.0 GHz.

Step 6: take out the hot-pressed square material or sheet material to obtain a formed laminated wood with a certain specification and stack the laminated wood for storage.

Compared with an ordinary hot-press forming technology, the method improves the forming efficiency by 240%. The strength comparison is shown in the following table.

|  | Static bending intensity (MPa) | Elasticity modulus (MPa) | Shear strength (MPa) |
| --- | --- | --- | --- |
| Common laminated wood of eucalyptus | 61.5 | 8000 | 3.2 |
| Laminated wood of eucalyptus in this embodiment | 86.0 | 11100 | 4.5 |

Embodiment 3

Step 1: send a machined small wood material (pine) into an ordinary wood drying kiln for drying to a moisture content of 8%.

Step 2: prepare a urea-formaldehyde resin adhesive having a solid content of 60%.

Step 3: lay the dried small wood material into a square material or a sheet material with a certain specification according to a gluing and assembly process in the process of production of ordinary laminated wood, where the amount of glue applied is 250 g/m².

Step 4: clamp the laid square material or sheet material with a certain specification through a three-dimensional metal clamp, where a clamping force is 1.5 MPa.

Step 5: send the clamped square material or sheet material together with the clamp into a wood microwave heating machine, where the heating time is 5 min, a hot-pressing temperature is 180□, and a microwave frequency is 2.5 GHz.

Step 6: take out the heated square material or sheet material to obtain a formed laminated wood with a certain specification and stack the laminated wood for storage.

Compared with an ordinary hot-press forming technology, the method improves the forming efficiency by 260%. The strength comparison is shown in the following table.

|  | Static bending intensity (MPa) | Elasticity modulus (MPa) | Shear strength (MPa) |
| --- | --- | --- | --- |
| Common laminated wood of pine | 60.7 | 7980 | 3.0 |
| Laminated wood of pine in this embodiment | 83.5 | 10200 | 4.3 |

The above are only preferred embodiments of the present invention and are not intended to limit the present invention in any way. Therefore, any simple modifications and equivalent changes to the above embodiments in accordance with the technical essence of the present invention without departing from the contents of the technical solutions of the present invention should fall within the protection scope of the technical solutions of the present invention.

What is claimed is:

1. A method for quick hot-press forming of laminated wood, comprising the following steps:
   step S1: drying a machined small wood material to a moisture content of 5-8 wt %;
   step S2: gluing the dried small wood material, and assembling and laying the dried small wood material to be a square material or a sheet material, wherein an adhesive for the gluing is a urea-formaldehyde resin adhesive having a solid content of 45-60 wt %, and the amount of the adhesive is 150-360 g/m²;
   step S3: clamping the square material or the sheet material through a three-dimensional metal clamp with a clamping force of 1.5-2.5 MPa; and
   step S4: sending the clamped square material or sheet material together with the clamp into a microwave heating machine for microwave heating to obtain a formed laminated wood, wherein the time from the gluing to the entry into the microwave heating machine is controlled to not exceed 15 min, the microwave heating operating temperature is 100-200° C., and the microwave heating microwave frequency in step S4 is 1.5-2.5 GHz.

2. The method for quick hot-press forming of laminated wood according to claim 1, wherein the time from the square material or sheet material entry into the microwave heating machine to the leaving from the microwave heating machine in step S4 is 5-10 min.

* * * * *